United States Patent [19]

Thiele et al.

[11] Patent Number: 5,072,331
[45] Date of Patent: Dec. 10, 1991

[54] SECURE CIRCUIT STRUCTURE

[75] Inventors: Alan G. Thiele, San Diego; Ronald L. Williams, San Marcos, both of Calif.

[73] Assignee: Hughes Aircraft Company, Los Angeles, Calif.

[21] Appl. No.: 692,334

[22] Filed: Apr. 26, 1991

[51] Int. Cl.$^5$ .......................... H02B 1/00; G11C 7/00
[52] U.S. Cl. ........................................ 361/380; 365/53
[58] Field of Search ........................... 361/380; 365/53

[56] References Cited

U.S. PATENT DOCUMENTS

| | | | |
|---|---|---|---|
| 4,766,516 | 8/1988 | Ozdemir et al. | 361/380 |
| 4,933,898 | 6/1990 | Gilberg et al. | 365/53 |
| 4,982,371 | 1/1991 | Bolan | 365/228 |

Primary Examiner—Donald Griffin
Attorney, Agent, or Firm—W. C. Schubert; W. K. Denson-Low

[57] ABSTRACT

A secure circuit structure includes a pair of opposed substrates having a volatile circuit fabricated on at least one, and preferably both substrates. A maintenance circuit for the volatile circuit extends between the substrates so that it is interrupted, thereby altering the volatile circuit and rendering reverse engineering attempts futile, if the substrates are moved with respect to each other by opening the circuit package. The maintenance circuit preferably includes a series of mating conductive indium bumps that extend from the opposed substrates and mechanically bond the substrates together. The secured volatile circuit may be a random access memory storing an access code, maintained by a battery power supply circuit.

20 Claims, 2 Drawing Sheets

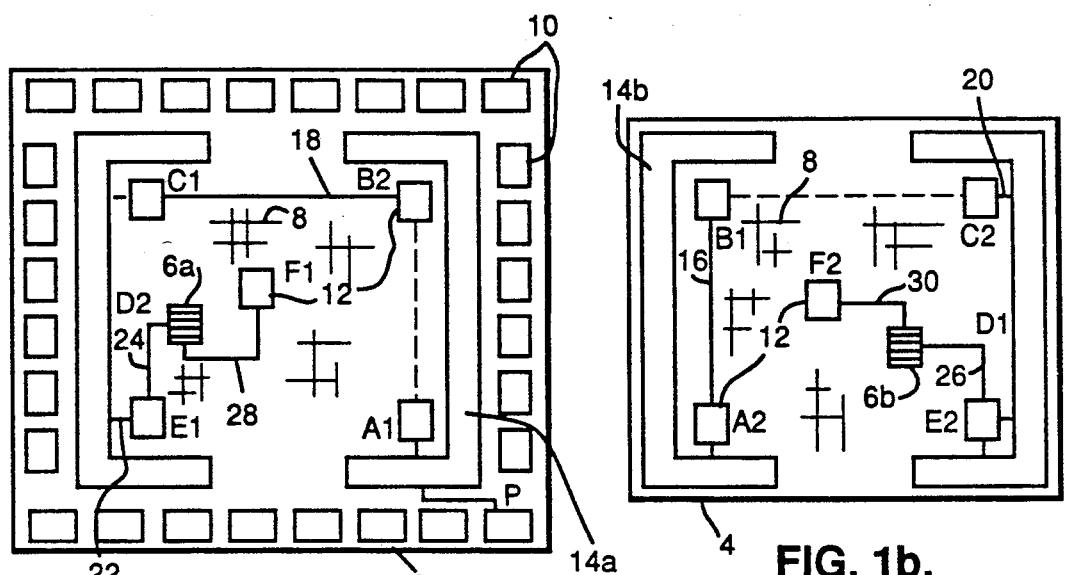
FIG. 1a.
FIG. 1b.
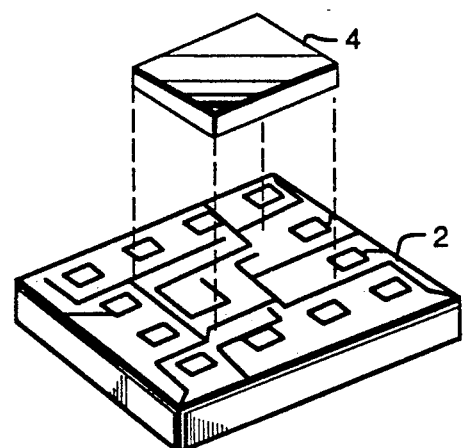
FIG. 2.
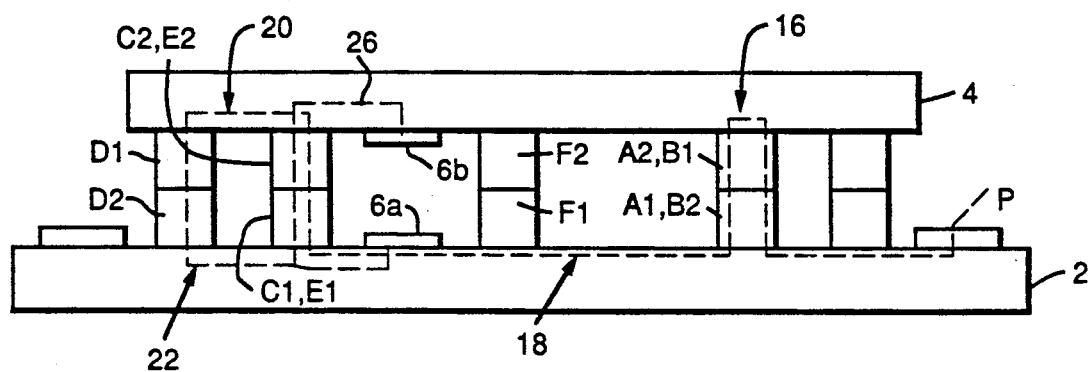
FIG. 3.

SECURE CIRCUIT STRUCTURE

BACKGROUND OF THE INVENTION

1. Field of the Invention

This invention relates to the protection of electrical circuitry from reverse engineering, and more particularly to the protection of access codes embedded within integrated circuitry.

2. Description of the Related Art

It is very important to prevent unauthorized access to certain portions of electrical circuits, particularly integrated circuits. For example, digital codes or other data may be stored in certain portions of the circuit to prevent its unauthorized use; the circuit will function properly only if the user enters the appropriate code. Such circuitry may be compromised, however, by various methods of analysis, such as visual inspection, micro-probing, secondary electron emission voltage-contrast analysis, etc. A number of techniques have been used in the past to prevent such reverse engineering.

Perhaps the most basic technique is to enclose the circuit in plastic encapsulation or protective die coating. However, access to the circuitry can be gained by mechanical or acid drilling through the encapsulation material. Another approach is to add misleading circuit topology so as to disguise the portion of the circuitry to be protected, or to customize each different die with its own specific code. An example of this approach is disclosed in U.S. Pat. No. 4,766,516, "Method and Apparatus for Securing Integrated Circuits from Unauthorized Copying and Use," Aug. 23, 1988, to Ozdemir et al. and assigned to Hughes Aircraft Company. These techniques may retard, but generally do not totally prevent, successful reverse engineering. U.S. Pat. No. 4,766,516 also discloses a use control scheme for a secure system which has circuitry on several printed circuit boards. Each circuit transmits a control code to enable the circuitry on the next board in order when it itself has received its control code; an external software verification unit transmits the control code for the first board. Overall system operation is disabled if any of the boards are tampered with or missing.

Other methods include changing the circuit chip at regular intervals, and encapsulating the chip with wires that easily break if an attempt is made to open the encapsulation and probe the chip. Such methods are discussed in W. Diffie and M. E. Hellman, "Privacy and Authentication: An Introduction to Cryptography", *Proc. IEEE*, Vol. 67, No. 3, March, 1979.

SUMMARY OF THE INVENTION

The present invention seeks to provide a circuit structure that is more secure than prior circuits, and disables itself when access is attempted so that it cannot be reverse engineered.

The circuit structure includes a pair of opposed substrates, with a volatile circuit fabricated on at least one of the substrates so that it faces the other substrate. The substrates are held in a fixed position with respect to each other, with the volatile circuit maintained by a maintenance circuit that extends between the substrates. Moving the substrates with respect to each other interrupts the maintenance circuit, thereby altering the volatile circuit so that it cannot be successfully reversed engineered.

In a preferred embodiment, the maintenance circuit includes several pairs of opposed conductive indium bumps that extend from the opposed substrates to contact each other and establish both a mechanical bond and an electrical path for the maintenance circuit. This circuit extends in multiple traverses back and forth between the substrates, through the bumps. The volatile circuit may be divided into portions located on each of the substrates, in which case the maintenance circuit can also interconnect the divided portions. Opposed peripheral dams may also be provided on the substrates to impede access to the interior of the circuit structure. The dams may be connected such that open circuiting a pair of opposed dams or short circuiting adjacent dams also interrupts the maintenance circuit.

The volatile circuit is preferably implemented as a volatile memory, with a power supply circuit for the memory serving as the maintenance circuit. Moving the substrates relative to each other breaks the power supply circuit, causing the memory information to erase in the case of a static memory, or to decay for a dynamic memory. In either case, a secure code originally written into the memory is altered so that reverse engineering the memory will not yield the original code.

These and other features and advantages of the invention will be apparent to those skilled in the art from the following detailed description, taken together with the accompanying drawings, in which:

BRIEF DESCRIPTION OF THE DRAWINGS

FIGS. 1a and 1b are plan views of the two substrates before they are joined together in the secure circuit structure;

FIG. 2 is a perspective view of the two substrates about to be joined together;

FIG. 3 is an elevation view of the circuit structure, with a maintenance circuit indicated in dashed lines;

DETAILED DESCRIPTION OF THE INVENTION

Figure 5:
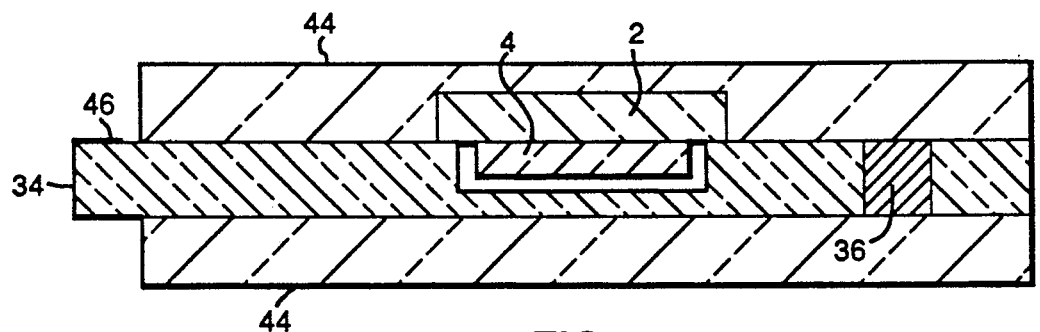
FIG. 5 is a sectional view of the circuit structure mounted on the circuit board.
Figure 4:
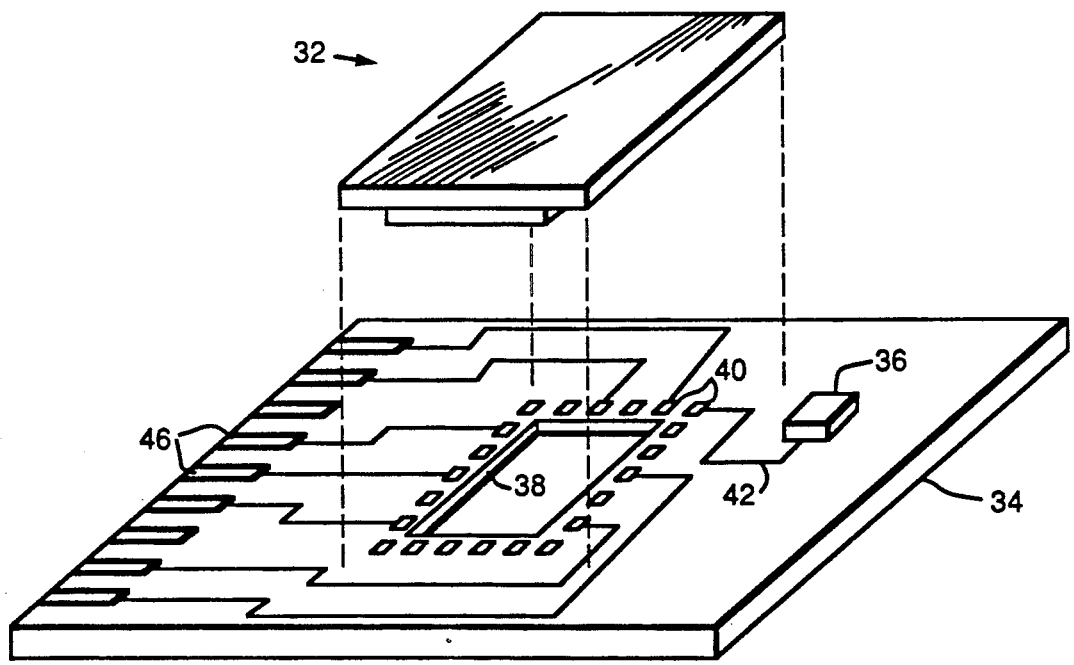
FIG. 4 is a perspective view of the secure circuit structure aligned for attachment to a circuit board.

The present invention takes a direct departure from the prior approach of trying to protect a secure circuit by preventing physical access to the circuit. In the new approach described herein, it is conceded that someone who wishes to reverse engineer the secure circuit may gain physical access to it. However, it establishes a circuit structure that modifies the secure circuit in case such physical access is gained, thereby frustrating any attempts to reverse engineer the original circuit.

A somewhat simplified circuit structure that illustrates the principles of the invention is shown in FIGS. 1a and 1b. The circuit structure is formed from a pair of substrates 2 and 4, prepared from a suitable semiconductor material such as silicon. When assembled, substrate 4 is "flip-chip" mounted to substrate 2 as illustrated in FIG. 2, with the circuits on each substrate facing each other.

A circuit 6a to be secured is fabricated on substrate 2. The entire circuit may be formed on substrate 2, or it may be divided into two portions, with one portion 6a on substrate 2 and the other portion 6b on substrate 4.

The secure circuit is preferably implemented as a volatile digital memory, such as a static or dynamic RAM (random access memory). Dynamic RAM cells use a transistor and capacitor combination, with the digital information represented by a charge stored on each of the capacitors in the memory array. A static RAM, on the other hand, uses a series of transistors to form a flip-flop for each cell in the array. Both types of memory are considered "volatile" in the sense that they must be constantly maintained to retain their memory codes. The maintenance function is performed by a power supply. If a dynamic RAM is not replenished with a refresh signal (typically every two ms), as well as supplied with a power supply signal, the capacitors will lose their charge and the code will be altered. If power is removed from a static memory, the flip-flop will reset and the memory will display a different code when power is restored.

While a RAM using non-symmetrical transistor elements is used in the preferred embodiment of the invention, any other type of secure circuit that similarly requires the presence of a maintenance circuit to retain the original circuit configuration could be employed. The secure circuit 6a, 6b will generally be part of a larger overall circuit, indicated by hash lines 8.

Substrate 2 is larger than substrate 4, and includes a series of conductive contact pads 10 around its periphery for electrically communicating with a circuit board. At least one conductive "bump" 12, and preferably a plurality of such bumps, are formed on the opposed faces of the two substrates in alignment with each other. Substrate 4 is emplaced over substrate 2 so that the opposed conductive bumps on the two substrates mate with each other, providing electrical connections between the substrates and also a mechanical engagement that bonds the substrates in place and prevents them from moving with respect to each other. Conductive bump technology is known in the art, and is described for example in U.S. patent application Ser. No. 486,669, filed Feb. 28, 1990 by James L. Gates and assigned to Hughes Aircraft Company, the assignee of the present invention.

The conductive bumps are preferably formed from indium. One of the advantages of indium is that it has a lower melting temperature than most adhesive bonds and is attacked by acids, so that if access to the secure circuit is attempted by chemical melting through one of the substrates, the electrical connection provided by the indium contacts will be broken. As explained below, this will cause the secure code stored in the memory circuit to be altered, so that even if it is reversed engineered, the wrong code will be discovered.

Solder bumps could be used instead of indium bumps. With solder bumps, however, the spacing between the substrates would be about 25 microns, as opposed to about 4-6 microns for indium bumps. Solder bumps thus leave more clearance between the substrates for inserting a probe to access the secure circuitry. The bumps might also be formed from other conductive materials such as gold or conductive adhesive.

In the preferred embodiment illustrated in the drawings, a power supply circuit for the volatile memory 6a, 6b includes a number of conductive bumps pairs that are connected in series as part of the power supply circuit. Separating or otherwise moving the substrates with respect to each other to gain access to the secure circuitry requires that these pairs be broken. In this event the power supply circuit is interrupted and the volatile memory which it serves changes state, thus rendering harmless any access to the secure circuit after it has been exposed. In the case of a dynamic RAM, the refresh circuit rather than the power supply circuit might be interrupted by moving the substrates relative to each other to implement the memory change of state.

To impede lateral access to the internal circuitry, especially when the substrates are spaced fairly wide apart from each other as in the case of solder bumps, opposed conductive dams 14a and 14b may be formed on substrates 2 and 4, respectively, around the internal circuitry. The conductive dam 14b on substrate 4 is located in the peripheral region of that substrate, while the conductive 14a dam on substrate 2 is located inward of the contact pads 10. The conductive dams are fabricated in a manner similar to the conductive bumps, and will generally be of the same material. They physically impede lateral access to the internal circuitry, and may be connected in series with the conductive bumps as part of the maintenance circuit. Separating the substrates thus also separates the mating dams, again open circuiting the power supply circuit. The dams on each substrate may be divided into separate segments, with one of the segments included in the power supply circuit and the other segment maintained at a different voltage level. By positioning the segments fairly close to each other, any attempt to probe the internal circuitry through the space between adjacent segments will tend to short circuit the segments, again interrupting the power supply for the secure memory.

While the power supply circuit may make only a single traverse between one substrate and the other, the circuit structure is preferably fabricated so that it makes multiple traverses, thereby providing assurance that it will be interrupted if the structure is tampered with. Such an arrangement is illustrated in FIGS. 1a, 1b and 3. In FIG. 3 the power supply circuit is indicated in dashed lines just below the opposed surfaces of the two substrates, although in practice it would be implemented by a metallization pattern on the surfaces themselves. Also, memory circuits 6a and 6b are shown on the substrate surfaces, while in practice they would be embedded within the substrates.

An external power supply such as a battery is connected to the circuit structure described thus far at one of the contact pads P on substrate 2. An electrical connection is made between contact pad P and one of the conductive bumps A1 on the same substrate by extending under the adjacent dam if present with a dielectric layer separating the two. The circuit continues from bump A1 on substrate 2 to the aligned bump A2 on substrate 4. The convention used for these figures is that, for an aligned pair of conductive bumps or dams, the bump or dam on the power supply side is indicated by the numeral "1", while the opposed bump or dam on the secure circuit side is indicated by the numeral "2". Also, an electrical connection on one substrate is indicated by a solid line, while the image of that connection on the opposed substrate is indicated by a dashed line.

Continuing with the power supply circuit, it extends in succession from bump A2 to bump B1 via lead 16 on substrate 4; from bump B1 to bump B2 on substrate 2; from bump B2 to bump C1 on substrate 2 via lead 18; from bump C1 to bump C2 on substrate 4; from bump C2 to dam D1 via lead 20 on substrate 4; from dam D1 on substrate 4 to dam D2 on substrate 2; from dam D2 to bump E1 via lead 22 on substrate 2; and finally from bump E1 to memory circuit 6a via lead 24 on substrate 2 and to memory 6b via bump E2 and lead 26 on substrate 4. Signal connections between the two segments of the memory circuit are provided along lead 28 (substrate 2) and lead 30 (substrate 4) via bumps F1 and F2.

After assembly, the two substrates may be encapsulated by conventional techniques if desired, with the wire bonding pads around the periphery of substrate 2 left exposed. The completed circuit package 32 can then be mounted to a printed circuit board 34 that includes a power supply such as a battery 36. An opening 38 is formed in the printed circuit board just larger than the outer dimensions of substrate 4, so that the secure circuit package 32 can be mounted to the board with the substrate 4 fitting in opening 38. A series of wire bonding pads 40 on the board around the periphery of opening 38 mate with pads 10 on the larger substrate 2. The battery 36 is connected via lead 42 on the circuit board to a board pad P′ that mates with power supply pad P on the substrate 2. The assembly may then be encapsulated within encapsulation layers 44 by conventional techniques, with external contact pads 46 along the periphery of the circuit board 44 left exposed. The assembly may also be packaged separately, independent of an integrated circuit board, using conventional integrated circuit packaging techniques.

While a particular embodiment of the invention has been shown and described, numerous variations and alternate embodiments will occur to those skilled in the art. Accordingly, it is intended that the invention be limited only in terms of the appended claims.

We claim:

1. A secure circuit structure, comprising:
   a pair of opposed substrates with a volatile circuit fabricated on at least one of said substrates and facing the other substrate,
   means positioning said substrates with respect to each other, and
   a maintenance circuit for said volatile circuit extending between said substrates such that said maintenance circuit is interrupted, thereby altering said volatile circuit, if said substrates are moved with respect to each other.

2. The circuit structure of claim 1, said maintenance circuit including at least one pair of opposed conductive bumps extending from said opposed substrates and contacting each other.

3. The circuit structure of claim 2, said bumps comprising at least a portion of said positioning means.

4. The circuit structure of claim 2, said bumps being formed from indium.

5. The circuit structure of claim 2, said maintenance circuit including multiple pairs of opposed conductive bumps extending from said opposed substrates and contacting each other, said maintenance circuit extending in multiple traverses back and forth between said substrates through said bumps such that, if said substrates are moved with respect to each other, the electrical connectivity of said maintenance circuit is altered via open circuiting the maintenance circuit, interrupting the supply of maintenance signals which maintain the secure contents of said volatile circuitry.

6. The circuit structure of claim 2, said bumps being located inward from the peripheries of said substrates, said maintenance circuit further including at least one pair of opposed conductive dams extending from said opposed substrates in the peripheral region of at least one of the substrates and contacting each other, said dams impeding access to the interior of said circuit structure.

7. The circuit structure of claim 6, including multiple pairs of said dams that are segmented with respect to each other, said dams being connected in said maintenance circuit such that open circuiting a pair of opposed dams by moving said substrates with respect to each other or short circuiting adjacent segmented dams by attempting to probe between them alters the electrical connectivity of said maintenance circuit, thus interrupting the supply of maintenance signals which maintain the secure contents of said volatile circuitry.

8. The circuit structure of claim 1, wherein said volatile circuit is divided into portions located on each of said substrates.

9. The circuit structure of claim 8, wherein said maintenance circuit interconnects the portions of said volatile circuit on each substrate.

10. The circuit structure of claim 1, further comprising a larger circuit on at least one of said substrates, said volatile circuit comprising a portion of said larger circuit.

11. The circuit structure of claim 1, said maintenance circuit comprising a power supply circuit for said volatile circuit.

12. A secure electrical assembly, comprising:
    a circuit board having an opening therein,
    a plurality of chip contact pads on the circuit board adjacent the periphery of said opening,
    a power supply means on said circuit board electrically connected to at least one of said chip contact pads,
    input/output contact pads on said circuit board electrically connected to respective chip contact pads, and
    a secure circuit structure, comprising:
      a first substrate disposed over said circuit board, said first substrate having a plurality of contact pads adjacent its periphery that are electrically connected to at least some of said chip contact pads, and a power supply contact pad electrically connected to the chip contact pad to which said power supply means is connected,
      a second substrate held within said opening adjacent to and facing said first substrate,
      a volatile circuit on at least one of said substrates facing the other substrate, and
      a power supply circuit extending between said substrates from said power supply contact pad to supply power to said volatile circuit such that said power supply circuit is interrupted, cutting off power to said volatile circuit, if said substrates are moved with respect to each other.

13. The electrical assembly of claim 12, said power supply circuit including at least one pair of opposed conductive bumps extending from each substrate and contacting each other.

14. The electrical assembly of claim 13, the opposed bumps on each substrate being secured to each other to hold said substrate together in spaced relationship.

15. The electrical assembly of claim 13, said bumps being formed from indium.

16. The electrical assembly of claim 13, said power supply circuit including multiple pairs of opposed conductive bumps extending from each substrate and contacting each other, said maintenance circuit extending in multiple traverses back and forth between said substrates through said bumps.

17. The electrical assembly of claim 13, said bumps being located inward from the peripheries of said substrates, said power supply circuit further including at least one pair of opposed conductive dams extending from each substrate in the second substrate's peripheral region and contacting each other, said dams impeding access to said volatile structure.

18. The electrical assembly of claim 17, including multiple pairs of said dams that are segmented with respect to each other, said pairs of dams being divided between active and ground portions of said power supply circuit such that open circuiting a pair of opposed dams or short circuiting adjacent segmented dams interrupts the power supply circuit.

19. The electrical assembly of claim 12, wherein said volatile circuit is divided into portions located on each of said substrates.

20. The electrical assembly of claim 19, wherein said power supply circuit interconnects the portions of said volatile circuit on each substrate.

* * * * *